(12) United States Patent
Ekström

(10) Patent No.: US 8,574,723 B2
(45) Date of Patent: Nov. 5, 2013

(54) SANDWICH MATERIAL FOR BRAZING WITH HIGH STRENGTH AT HIGH TEMPERATURE

(75) Inventor: Hans-Erik Ekström, Finspång (SE)

(73) Assignee: Sapa Heat Transfer AB, Finspang (SE)

( * ) Notice: Subject to any disclaimer, the term of this patent is extended or adjusted under 35 U.S.C. 154(b) by 293 days.

(21) Appl. No.: 12/937,914

(22) PCT Filed: Feb. 10, 2009

(86) PCT No.: PCT/SE2009/050139
§ 371 (c)(1),
(2), (4) Date: Nov. 11, 2010

(87) PCT Pub. No.: WO2009/128766
PCT Pub. Date: Oct. 22, 2009

(65) Prior Publication Data
US 2011/0042053 A1    Feb. 24, 2011

(30) Foreign Application Priority Data
Apr. 18, 2008  (SE) ..................... 0800898

(51) Int. Cl.
*B32B 15/20* (2006.01)
*B23K 35/22* (2006.01)
*B23K 20/04* (2006.01)
*C22F 1/04* (2006.01)

(52) U.S. Cl.
USPC ........ 428/654; 148/535; 148/528; 228/235.3; 228/262.51; 165/905

(58) Field of Classification Search
None
See application file for complete search history.

(56) References Cited

U.S. PATENT DOCUMENTS 3,168,381 A * 2/1965 Finnegan et al. ............. 428/654
3,261,724 A * 7/1966 Ulam ............................ 148/531

(Continued)

FOREIGN PATENT DOCUMENTS

JP    04-036600       2/1992
JP    06-228695   *   8/1994

(Continued)

OTHER PUBLICATIONS

English language translation of JP 04-036600. Feb. 1992.*

(Continued)

*Primary Examiner* — John J Zimmerman
(74) *Attorney, Agent, or Firm* — Morgan, Lewis & Bockius LLP

(57) ABSTRACT

The invention relates to a sandwich material for brazing comprising a core layer of a first aluminum alloy and a barrier layer of a second aluminum alloy characterized by that: the first alloy, constituting the core layer contains (in weight %): 0.8-2% Mn, ≤1.0% Mg, 0.3-1.5% Si, ≤0.3% Ti, ≤0.3% Cr, ≤0.3% Zr, ≤1.3% Cu, ≤0.5% Zn, ≤0.2% In, ≤0.1% Sn and ≤0.7% (Fe+Ni), the balance consisting of Al and ≤0.05% of each of the unavoidable impurities, and that the second alloy, constituting the barrier layer contains (in weight %): ≤0.2% Mn+Cr, ≤1.0% Mg, ≤1.5% Si, ≤0.3% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities, The invention also concerns a method for the manufacture of the sandwich material, a brazed product, such as a heat exchanger comprising the sandwich material and the use of the brazed product at high and low temperatures.

23 Claims, 7 Drawing Sheets

(56) References Cited

U.S. PATENT DOCUMENTS

| | | | |
|---|---|---|---|
| 3,917,151 A * | 11/1975 | Robinson | 228/220 |
| 4,246,045 A * | 1/1981 | Ulam | 148/531 |
| 6,000,886 A * | 12/1999 | Washio et al. | 408/1 R |
| 6,251,527 B1 * | 6/2001 | Schelin et al. | 428/582 |
| 6,627,330 B1 | 9/2003 | Shimizu et al. | |
| 7,255,932 B1 * | 8/2007 | Kilmer | 428/654 |
| 2004/0137260 A1 * | 7/2004 | Groll et al. | 428/652 |
| 2006/0078728 A1 | 4/2006 | Kilmer | |
| 2007/0122648 A1 * | 5/2007 | Vieregge et al. | 428/654 |
| 2012/0199634 A1 * | 8/2012 | Ekstr m et al. | 228/158 |

FOREIGN PATENT DOCUMENTS

| | | |
|---|---|---|
| JP | 2001-1179 | 1/2001 |
| JP | 2001-225187 | 8/2001 |
| JP | 2001-269794 | 10/2001 |
| JP | 2001-340989 | 12/2001 |
| JP | 2005-224851 | 8/2005 |
| JP | 2006-131923 | 5/2006 |
| JP | 2006-144041 | 6/2006 |
| JP | 2006-152380 | 6/2006 |
| JP | 2007-92165 | 4/2007 |
| SE | 9604458-1 | 6/1998 |

OTHER PUBLICATIONS

Wittebrood, A. et al., "Strain Induced Liquid Film Migration", 6$^{th}$ International Congress Aliminium Brazing, Düsseldorf, Germany, May 4-6, 2010, pp. 1-11.

Humphreys, F.J. et al., "Recrystallization annealing and related phenomena", Pergamon 1996, ISBN 008 0418848, pp. 235, 271-279.

Wittebrood, A. et al., "Liquid Film Migration in Aluminium Brazing Sheet?", 10$^{th}$ International Conference on Aluminium Alloys, Materials Science Forum, vols. 519-521, Jul. 2006, Trans Tech Publications Ltd, pp. 1151-1156.

Nylèn, et al.; "Mechanistic Studies of Brazing in Clad Aluminium Alloys," *Materials Science Forum* vols. 217-222, 1996, pp. 1703-1708.

Engström, et al.; "A Multilayer Clad Aluminum Material with Improved Brazing Properties," *Welding Research Supplement*, Oct. 1988, pp. 222-s to 226-s.

Marchall, et al.; "Microstructural Control in an Aluminum Core Alloy for Brazing Sheet Applications," *Metallurgical Transactions A*, vol. 24A, Sep. 1993, pp. 1935-1942.

Takigawa, et al.; "Materials and Process Factors in Non-corrosive Flux Brazing for Aluminum Automobile Heat Exchangers," *Kobelco Technology Review*, No. 16, Apr. 1993, pp. 34-36.

Office Action for Japanese Patent Application No. 2011-504958, dated Mar. 19, 2013.

* cited by examiner

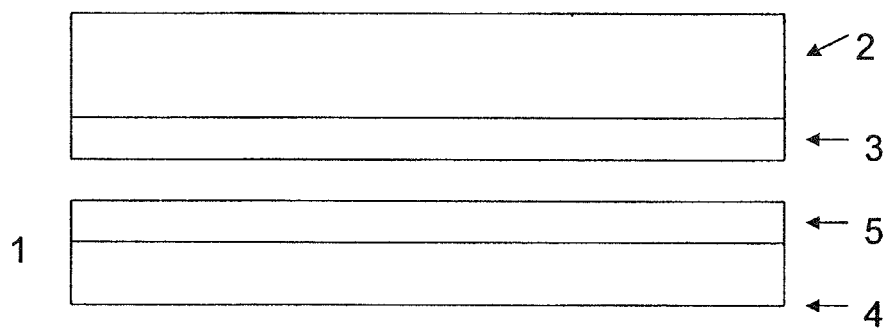
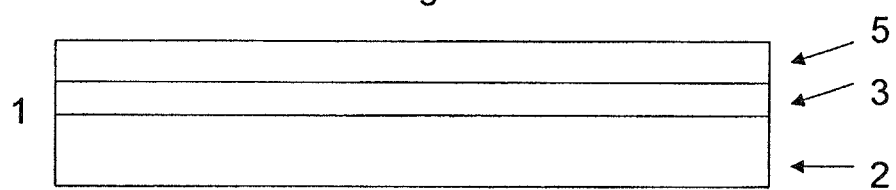

SANDWICH MATERIAL FOR BRAZING WITH HIGH STRENGTH AT HIGH TEMPERATURE

CROSS REFERENCE TO RELATED APPLICATIONS

This application is the National Stage of International Application No. PCT/SE2009/050139, filed Feb. 10, 2009, and claims benefit of Swedish Application No. 0800898-9, filed Apr. 18, 2008.

The present invention relates to sandwich material for brazing, a method for manufacturing sandwich material, a brazed product, and the use of a brazed product.

BACKGROUND

Aluminum is a frequently used material for the manufacture of products by brazing. Aluminum can be alloyed by the addition of various alloying elements, for example Mn, Mg, Ti, and Si whereby the aluminum alloy strength is affected by the precipitation of particles or by the alloying elements forming a solid solution with aluminum.

Materials for brazing of the above type can be given a high strength after brazing by cold-processing prior to brazing, that is, rolling or stretching at temperatures below 200° C. whereby the strength is increased, and through being performed in such a manner so as not to lose the increase in strength produced by brazing. This means that re-crystallization of the material is prevented altogether through the heat treatment that the brazing entails. Such materials may also be given a high strength with respect to fatigue and creep during use at high temperatures, up to and including 300° C. This high strength at high temperature is achieved both by reducing the driving force for re-crystallization by choosing a suitably high degree of deformation for cold processing and increasing the retarding force by creating a moderately large amount of particles per unit volume.

Materials for brazing can be clad with a braze cladding of an alloy with high silicon content. At brazing such a material is arranged next to another detail, and heated in a brazing oven. The high silicon content in the brazed layer leads to melting of the braze cladding at lower temperatures than the underlying core layer, and floating away due to capillary strength and the difference in surface tension, producing braze metal joints.

Another variant of the material for brazing does not have any braze cladding but rather is brazed to a material with such a layer. For example, such materials can be used in tubes formed of sheet metal. In the manufacture of, for example, a heat exchanger, tubes are arranged against the braze plated fins and end plates and then heated in a brazing oven whereby the braze cladding melts and flows away because of the capillary strength and difference in surface tension and produces brazed joints.

If the material of the parts to be brazed is not recrystallized at the braze metal melting temperature, some of the silicon from the braze metal will penetrate the material to be brazed when warming to brazing temperature. This means that the melting point of the braze metal increases and the ability to form braze joints diminishes or disappears. Penetration of silicon occurs through diffusion, melting of the surface layer or so-called "Liquid Film Migration" [see, for example, A. Wittebrod, S. Desikan, R. Boom, L. Katgerman, Materials Science Forum Vols. 519-521, (2006) pp. 1151-1156)].

Therefore, material for brazing as above, which does not recrystallize upon brazing, must be produced with a barrier layer. Materials for brazing which are produced with barrier layers are preferably referred to as sandwich material. The function of the barrier function is to reduce penetration of silicon from the braze metal to the underlying core material and thus to ensure the formation of a good braze joint. Silicon diffuses easily in the grain boundaries. It is therefore important to form large grains of barrier layer, so that there are few grain boundaries. This should be done before the temperature during brazing becomes so high that the diffusion rate of the silicon is high. The loss of silicon from the braze cladding of the braze coated material is therefore reduced by producing the barrier layer so that it recrystallizes in a coarse grain size when heated to the brazing temperature.

A problem with known types of material for brazing is that they do not have sufficiently high fatigue and creep resistance at high temperatures.

Two examples of products that require improved fatigue resistance and creep resistance at temperatures above 150° C. and up to 300° C. are charge air coolers and coolers for exhaust gas which is converted to new fuel in car engines. These products are usually manufactured by brazing sandwich material. Increased demands on engines such as reduced emission of harmful gases and improved efficiency means that these coolers are exposed to increasingly higher operating temperatures and gas pressure. This causes problems because existing sandwich materials do not meet strength requirements. Standard car coolers which do not reach operating temperatures of more than 100° C. are manufactured today in relatively coarse dimensions due to strength requirements. The high weight contributes to high fuel consumption. The high amount of material that is used in coolers also makes them costly to manufacture.

A further problem with known materials for brazing is that the sandwich plate sometimes bends upwards or downwards in a longitudinal direction when rolling several layers at the same time by hot-rolling. Such an occurrence can be harmful to personnel and damage adjacent equipment; and can result in the rolling of the plate not being completed. Additionally, there are large variations in thickness of the barrier layer over the strip width.

SUMMARY OF THE INVENTION

One aim of the present invention is to provide a sandwich material for brazing, which has high strength at both low and high temperatures especially against creep and fatigue, and where at least one of the above problems are solved. This aim is achieved with a sandwich material according to the invention. An additional aim of the invention is to define a method for manufacturing a sandwich material for brazing, which has high strength at both low and high temperatures. This means that thinner material can be used, resulting in material savings and a lower weight of heat exchangers for vehicles and consequently, reduced fuel consumption. This aim is achieved by the method according to the invention. A further aim of the present invention is to provide a product in which a sandwich material exhibiting high strength at both low and high temperatures is included. This aim is achieved by the requirements defined in the patent product. An additional aim of the present invention is the use of a brazed product, in which a sandwich material according to above is included, with operating temperatures reaching over 150° C., preferably above 200° C., preferably above 250° C. An additional aim of the present invention is the use of brazed products, in which a sandwich material according to the above is included at even lower operating temperatures, up to 100° C., while thinner material than usual can be used to minimize material usage or weight and fuel consumption. These aims are achieved through the use of the brazed product defined in the patent claims.

The invention relates to a sandwich material for brazing comprising a core layer of a first aluminum alloy and a barrier layer of a second aluminum alloy in which the first alloy, constituting the core layer contains (in weight %): 0.8-2% Mn, ≤1.0% Mg, 0.3-1.5% Si, ≤0.3% Ti, ≤0.3% Cr, ≤0.3% Zr, ≤1.3% Cu, ≤0.5% Zn, ≤0.2% In, ≤0.1% Sn and ≤0.7% (Fe+Ni), the balance consisting of Al and ≤0.05% of each of the unavoidable impurities, and the second alloy, constituting the barrier layer contains (in weight %): ≤0.2% Mn+Cr, ≤1.0% Mg, ≤1.5% Si, ≤0.3% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities, whereby the barrier layer is the outermost layer of the sandwich material on the side of the sandwich material to be brazed to another article.

Such a material is especially appropriate for brazing against a surface which is coated with brazing metal. Preferably, there is no additional layer of any kind on the side of the barrier layer which is remote from the core layer.

The invention relates to sandwich material for brazing comprising a core layer of a first aluminum alloy, a barrier layer of a second aluminum alloy and a braze layer in which the first alloy, constituting the core layer contains (in % weight): 0.8-2% Mn, ≤1.0% Mg, 0.3-1.5% Si, ≤0.3% Ti, ≤0.3% Cr, ≤0.3% Zr, ≤1.3% Cu, ≤0.5% Zn, ≤0.2% In, ≤0.1% Sn and ≤0.7% (Fe+Ni), the balance consisting of Al and ≤0.05% of each of the unavoidable impurities, and the second alloy, constituting the barrier layer contains (in weight %): ≤0.2% Mn+Cr, ≤1.0% Mg, ≤1.5% Si, ≤0.3% Ti, 0.2% Zr, ≤0.3% Cu, ≤0.5% Zn, ≤0.2% In, ≤0.1% Sn and ≤1.5% (Fe+Ni), the balance Al and ≤0.05% of each of the unavoidable impurities.

Sandwich materials as described above involve several advantages; the barrier layer recrystallizes in a coarse grain size upon heating to the brazing temperature, whereby diffusion of silicon from the braze metal to the core is significantly reduced. The carefully balanced alloying levels in the core layer and barrier layer help to give the sandwich material good strength properties at high temperatures because the re-crystallization of the core layer is prevented. The material therefore exhibits high fatigue strength and good creep resistance at temperatures up to 300° C. After brazing the sandwich material exhibits very good braze joints and very good strength characteristics. Brazed products made of sandwich material can be manufactured by rolling without bending or deviations from the rolling line.

The core layer may consist of an alloy containing (in weight %): 0.8-2% Mn, ≤1.0% Mg, 0.5-0.9% Si, ≤0.3% Ti, ≤0.3% Cr, ≤0.3% Zr, ≤1.3% Cu, ≤0.5% Zn, ≤0.2% In, ≤0.1% Sn and ≤0.7% (Fe+Ni), the balance Al and ≤0.05% of each of the unavoidable impurities. Sandwich material comprising such a core layer has good properties in so far as static and dynamic strength at high temperatures and creep resistance is concerned.

The core layer may consist of an alloy containing (in weight %): 0.8-2.0% Mn, ≤1.0% Mg, 0.5-0.9% Si, ≤0.3% Ti, ≤0.3% Cr, ≤0.2% Zr, ≤0.3% Cu, ≤0.5% Zn, ≤0.2% In, ≤0.1% Sn and ≤0.35% (Fe+Ni), the balance consisting of Al and ≤0.05% of each of the unavoidable impurities. Sandwich material comprising such a core layer has particularly good fatigue properties at high temperatures because the carefully balanced alloying levels help to create many small and stable precipitations.

The core layer may consist of an alloy containing (in weight %): 1.0-1.7% Mn, ≤1.0% Mg, 0.5-0.9% Si, ≤0.3% Ti, ≤0.3% Cr, ≤0.2% Zr, ≤0.3% Cu, ≤0.5% Zn, ≤0.2% In, ≤0.1% Sn and ≤0.35% (Fe+Ni), the balance consisting of Al and ≤0.05% of each of the unavoidable impurities. A sandwich material comprising such a core layer has particularly good fatigue properties at high temperatures because the carefully balanced alloying levels help to create many small and stable precipitations.

The barrier layer may consist of an alloy containing (in weight %): ≤0.2% Mn+Cr, ≤1.0% Mg, 0.04-0.9% Si, ≤0.3% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities. Such a barrier layer recrystallizes in coarse grains, even if the layer is thin, since the lower manganese and chromium levels reduce the formation of dispersoids in the barrier layer and the material can be manufactured by rolling without bending or deviations from the rolling line.

The barrier layer may consist of an alloy containing (in weight %): ≤0.2% Mn+Cr, ≤1.0% Mg, 0.04-0.9% Si, 0.1-0.2% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities. Sandwich material comprising such a barrier layer is recrystallized in coarse grains even if the layer is thin, since the lower manganese and chromium levels reduce the formation of dispersoids in the barrier layer. The material can be manufactured by rolling without bending or deviations from the rolling line.

Sandwich material can also consist of a core layer which contains (in weight %): 1.0-1.7% Mn, ≤0.3% Mg, 0.5-0.9% Si, ≤0.3% Ti, ≤0.3% Cr, ≤0.2% Zr, ≤0.3% Cu, ≤0.5% Zn, ≤0.2% In, ≤0.1% Sn and ≤0.35% (Fe+Ni), the balance consisting of Al and ≤0.05% of each of the unavoidable impurities, and a barrier layer consisting of an alloy containing (in weight %): ≤0.2% Mn+Cr, ≤0.3% Mg, preferably 0.15-0.3% Mg, 0.04-0.9% Si, 0.1-0.2% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities. Sandwich material comprising such a core layer has particularly good fatigue properties at high temperatures because the carefully balanced alloying levels help create many small and stable precipitations. A magnesium content of ≤0.3% Mg % makes the sandwich material suitable for inert gas brazing using a braze flux if it is clad with an outer braze layer.

Sandwich material can also consist of a core layer which contains (in weight %): 1.0-1.7% Mn, ≤0.05% Mg, 0.5-0.9% Si, ≤0.3% Ti, ≤0.3% Cr, ≤0.2% Zr, ≤0.3% Cu, ≤0.5% Zn, ≤0.2% In, ≤0.1% Sn and ≤0.35% (Fe+Ni), the balance consisting of Al and ≤0.05% of each of the unavoidable impurities, and a barrier layer consisting of an alloy containing (in weight %): ≤0.2% Mn+Cr, ≤0.05% Mg, 0.04-0.9% Si, 0.1-0.2% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities. A sandwich material comprising such a core layer has particularly good fatigue properties at high temperatures because the carefully balanced alloying levels help to create many small and stable precipitations. A magnesium content of ≤0.5% Mg % implies that the sandwich material is suitable for inert gas brazing using a braze flux. If the sandwich material is coated with a braze cladding outside the barrier layer, a slightly higher Mg content, ≤0.3% Mg, can be accepted, even for inert gas brazing using a braze flux.

The sandwich material can consist of a core layer of a first aluminum alloy and a barrier layer of a second aluminum alloy which is arranged on one side of the core layer.

The sandwich material can consist of a core layer of a first aluminum alloy and two barrier layers of a second aluminum alloy which is arranged on each side of the core material.

The sandwich material can consist of a core layer of a first aluminum alloy, a barrier layer of a second aluminum alloy and a layer of another aluminum alloy that has corrosion protective properties, whereby the barrier layer and the corrosion protective layer is arranged on each side of the core layer.

After heating to brazing temperature, the barrier layer preferably exhibits a recrystallized structure with a grain size which parallel to the rolling surface is greater than 50 microns, which minimizes the penetration of silicon from the braze metal to the core, which in turn contributes to a stronger braze joint.

The core layer after brazing can exhibit a non-recrystallized or partially recrystallized structure. This structure of the core layer helps to increase the strength of the sandwich material.

After brazing, the sandwich material preferably exhibits a fatigue strength which is higher than 40 MPa at 1 million load cycles with a tensile load of R=0.1 at 300° C.

Before hot-rolling the barrier layer preferably exhibits a deformation resistance at a temperature of 200-500° C. which is at least 40% of the core layer maximum deformation resistance and recrystallizes during heating to brazing temperature.

The invention also concerns a method for manufacturing a sandwich material for brazing according to the above, including steps to: provide a first layer, consisting of a core layer of the first aluminum alloy; arranging of at least one layer of the second aluminum alloy, consisting of a barrier layer, on at least a first surface of the core layer; rolling the layers at a temperature of 200° C.-500° C.

The invention also concerns a method for manufacturing a sandwich material for brazing according to the above, including steps to: provide a first layer, consisting of a core layer, of the first aluminum alloy; arranging of at least one layer of the second aluminum alloy, consisting of a barrier layer, at a first surface area of the core layer; arranging at least one layer of a braze material on at least a first surface of the second aluminum alloy; rolling the layers at a temperature of 200° C.-500° C.

Alternatively, the layers can be cast at the same time so that they are already joined during casting. This method also has the advantage that variations in thickness of the layers after rolling are smaller.

If the sandwich material has a braze cladding outside the barrier layer, the barrier layer preferably exhibits, before hot-rolling, a deformation resistance at a temperature of 200-500° C. which is at least 40% of core layer maximum deformation resistance and re-crystallizes during heating to brazing temperature.

Through the methods described above, sandwich material for brazing is produced in a safe manner, that is, without any risk of the rolled material deviating from the rolling line and hurting surrounding personnel or damaging equipment. Sandwich materials can be rolled to strips or plates of different lengths because the risk of bending is minimized. Minor variations in thickness over the surface of the strip can occur. The method allows a safe and efficient production of sandwich material with high productivity and high return.

Before the hot-rolling an additional layer of the second aluminum alloy is arranged at a second surface of the core layer so that the core layer is surrounded by a barrier layer on both sides. Through such means sandwich material which may be brazed on both sides is achieved.

An additional layer of an aluminum alloy that has corrosion protective properties can be arranged at a second surface of the core layer so that the core layer is surrounded by a barrier layer on one side and a corrosion protective layer on the other side.

Before hot-rolling an additional layer of the second aluminum alloy and a layer of the braze material can be arranged at a second surface of the core layer so that the core layer is surrounded by an interlayer and a braze cladding on both sides. Through such means a sandwich material which may be brazed on both sides is achieved.

An additional layer of an aluminum alloy that has the corrosion protective properties can be arranged at a second surface of the core layer so that the core layer is surrounded by an interlayer and braze cladding on one side and a corrosion protective layer on the other side.

The material can be re-crystallization annealed following in a further step. Through crystallization annealing the sandwich material's internal structure is modified so that all layers are recrystallized. The layers rolled together must then undergo further processing in the form of cold rolling with a reduction of 5-20%, preferably 7-14%. Cold rolling leads to the material's internal structure being modified, whereby its mechanical properties are improved.

Alternatively, the sandwich material can be cold-rolled after hot-rolling, whereby the material dimensions are adjusted. The material is then re-crystallization annealed whereby the layer is recrystallized. The material is finally cold-rolled with a reduction of 5-20%, preferably 7-14%. These steps result in the sandwich material exhibiting an optimal structure after brazing. A barrier layer that is 13 microns thick or thicker provides an excellent resistance to penetration of silicon from the braze metal if the heating rate when brazing is at least 30° C./min.

The invention relates to a brazing product comprising the above-described sandwich material where the barrier layer has a recrystallized structure with a grain size which has a parallel rolling surface length which is at least 50 μm microns. The recrystallized, coarse grain structure of the barrier layer arising from heating to brazing temperature reduces diffusion of silicon from the braze metal to the core which in turn contributes to a stronger braze joint. This results in a brazed product that has high strength and excellent creep and fatigue properties, especially at high temperatures up to and including 300° C. The brazed product core layer may have a deformed, non-recrystallized or partially recrystallized structure showing yield strength $R_{p0.2}$ which is at least 65 MPa.

The brazed product preferably consists of sandwich material with a core layer that has a deformed, non recrystallized or partially recrystallized structure, and has yield strength of 200° C., $R_{p0.2}$, at least 65 MPa. This product has good corrosion resistance and high strength at high temperatures, especially against fatigue and creep.

The brazed product preferably consists of sandwich material with a core layer that has a deformed, non recrystallized or partially recrystallized structure, and has yield strength at 300° C., $R_{p0.2}$, at least 50 MPa.

The brazed product is preferably a heat exchanger, more preferably a charge air cooler.

The invention also relates to the use of a brazed product at operating temperatures reaching over 150° C., or above 200° C., or above 250° C. The product is particularly suitable for such use since it exhibits very good strength properties at high temperatures.

The brazed product is particularly suitable in the heat exchanger with operating temperatures below 100° C. because the high strength that the material exhibits at these temperatures means that the product's walls can be made thinner which leads to a cheaper product with low weight. The low weight is particularly advantageous in case the product is used in motor vehicles since the vehicle's fuel consumption is then reduced.

BRIEF LIST OF FIGURES

FIG. 1 shows schematically a first preferred embodiment of the sandwich material according to the invention.

FIG. 2 shows schematically a second preferred embodiment sandwich material according to the invention.

DETAILED DESCRIPTION OF THE INVENTION

Figure 3:
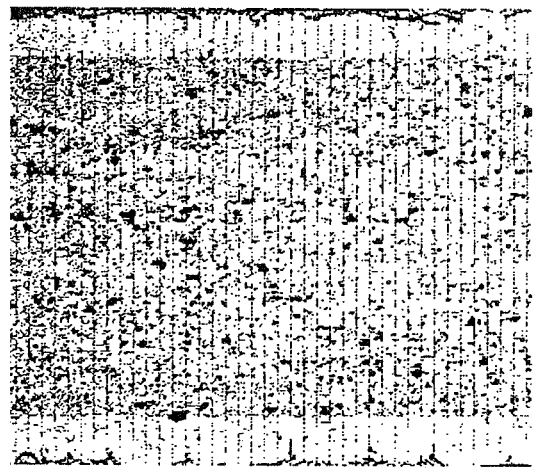
FIG. 3 shows the micro-structure of a longitudinal section through the sandwich material in Example 1 after braze simulating heat treatment.

The inventor has found that the problems with bending of the sandwich material during rolling is difficult in cases where the barrier layer is thick and the core alloy is much harder (has a much higher deformation resistance) than the barrier layer when hot rolling. Since the barrier layer of thin tubes must be thick, at least approximately 13 micron, to provide the desired protection, this renders the process especially difficult in this case.

The barrier layer could be made hard by solution hardening if higher contents of alloying elements which could be held in solution could be used, such as magnesium or copper. Some brazing methods such as inert brazing using a flux cannot achieve good brazing results if the magnesium content is too high. A high copper content in the barrier layer requires, for good corrosion resistance, that the core layer contains even more copper which is not always acceptable. Another method would be the addition of alloying elements that form particles. This is less advantageous because the barrier layer must recrystallize in coarse grains when heated to the brazing temperature before the diffusion rate for silicon is high, despite it being thin and the driving force for re-crystallization being low.

One problem is to find a barrier layer whose composition enables high enough deformation resistance when hot-rolled, or alternatively, where the layer is so thin that it is not likely that the sandwich plate will bend and which gives material that recrystallizes in a coarse grain size when heated to brazing temperature. Trials have shown that it is harder to stop silicon from the braze clad from entering the core material the more fine particles contained in the barrier layer and the thinner it is. The choice of alloying elements in the barrier layer is thus very limited with regard to rolling capacity and re-crystallization properties. The thickness required for the barrier layer to recrystallize and provide the necessary protection against silicon penetration is dependent on the heating rate when brazing.

The sandwich material according to the present invention has a high content of alloying elements in the core alloy which creates a large amount of particles per unit volume in order create a large anti re-crystallizing effect and a very high resistance to fatigue and creep at high temperatures.

Experiments with barrier layers of different hardness have unexpectedly shown that the risk of bending of the sandwich plate when hot-rolling is substantially reduced if the maximum deformation resistance of the barrier layer when hot-rolling at temperatures in the range of 200-500° C. does not vary too much from the core material's maximum deformation resistance. This deformation resistance of the barrier layer is obtained preferably through balanced alloying additives of the alloy barrier layer of copper, titanium, iron and silicon. The choice of alloy additives and their quantity is limited because the barrier layer must recrystallize in a coarse grain size at the brazing. The minimum thickness of the barrier layer is selected based on its desired function and the heating rate at the brazing.

As stated above, it is important to carefully choose the alloy elements and balance the alloy content in the core layer and barrier layer to obtain sandwich material with good mechanical properties at high temperatures and which can be manufactured by rolling without bending or deviations from the rolling line. Below is a description of the effect of individual alloying elements in the sandwich material.

Silicon contributes to deformation resistance especially at high deformation rates. The silicon content is preferably 0.3-1.5 weight percent in the core layer, more preferably 0.5-0.9 weight percent. Levels lower than 0.3 weight percent result in a reduced hardening effect, while over 1.5 weight percent results in significantly reduced solidus temperature and increases the risk of melting of the core alloy when brazing. In the barrier layer, the level of silicon should not be too high, in order to stop melting of the barrier layer when brazing. It is preferable that the silicon content in the barrier layer is below 1.5 weight percent and preferably below 0.9 weight percent. Preferably the silicon content in the barrier layer is 0.04-0.9 weight percent.

Magnesium increases the strength of the material by solution hardening if present in solid solution or by forming Mg2Si precipitations during aging. Magnesium increases deformation resistance when rolling at high temperatures making it advantageous for use in barrier layer. At too high contents the brazability is reduced because of the formation of a thick magnesium oxide layer on the surface and further, there is a risk of melting of the material at the brazing temperature which means that the magnesium content in the core layer is limited to 1.0 weight percent. For inert gas brazing using a braze flux, magnesium reacts with the braze flux which reduces brazing capacity. Magnesium content of the core layer is therefore limited to 0.05 weight percent if the material is to be used for inert gas brazing with braze flux, but if a braze cladding has been applied outside of the protection layer, up to 0.3 weight percent of magnesium can be accepted.

The magnesium content has generally been limited to 1.0 weight percent in the barrier layer for the same reasons as for the core layer. According to the most common brazing method today, the barrier layer may not contain higher levels of magnesium than about 0.05 weight percent since magnesium has a negative impact on the flux function. The magnesium content of the barrier layer should be ≤0.05 weight percent if the material is to be used for inert gas brazing using a braze flux but if a braze cladding has been applied outside of the protection layer, then up to 0.3 weight percent magnesium can be accepted, more preferably 0.15-0.3 weight percent. Higher levels of magnesium than 0.3 weight percent may be allowed if the material is vacuum brazed. In vacuum brazing the braze cladding should have a high magnesium content.

Zinc should be avoided at higher levels because it reduces corrosion resistance, up to 0.5% may be permitted in the core alloy and the barrier layer. If the material is used in structures where it is in close contact with metallic alloys containing zinc, then a zinc content at least 0.5 weight percent lower than the zinc content of the other alloy can be tolerated in the core layer.

Zirconium increases sagging resistance and gives increased resistance to re-crystallization. Up to 0.3 weight percent, preferably 0.06-0.3 weight percent zirconium can be added core layer's composition. Zirconium is distributed mainly by small Al3Zr particles; these particles will prevent re-crystallization and give rise to large grains in the material after brazing. Since Al3Zr particles are stable also at very high temperatures, above 300° C., they are important for fatigue and creep strength at high temperatures. Coarse precipitations are formed at more than 0.3 weight percent to the detriment of the ductility of the material. In the barrier layer the zirconium level should not exceed 0.2 weight percent or the barrier layer will not recrystallize during brazing to provide the desired protection against silicon penetration.

Titanium increases strength and may be present at up to 0.3 weight percent of the core layer. The titanium barrier layer can be up to 0.3 weight percent, preferably 0.1-0.2 weight percent. Since the titanium at these levels do not form precipitations that can slow down re-crystallization it is an excellent alloying element for increasing the deformation resistance of the barrier layer when rolling at high temperatures.

Manganese in solid solution increases strength, deflection resistance and corrosion resistance. Manganese in precipitations increases strength. Manganese forms with appropriate heat treatment at temperatures below 500° C. small precipitations, so-called dispersoids, with medium diameters of less than 0.5 micron, which increases sagging resistance and inhibits re-crystallization. Manganese content of the core layer should be 0.8-2.0 preferably 1.0-1.7 weight percent. In the barrier layer manganese content may not exceed 0.2 weight percent since the barrier layer should recrystallize at brazing temperature.

Iron and nickel have a negative effect on corrosion resistance and even more so on deflection resistance. The Fe+Ni content in the core layer has therefore been limited to 0.7 weight percent, preferably 0.1-0.7 weight percent. The Fe+Ni content should preferably be below 0.35 weight percent of the core layer, more preferably 0.15-0.35 weight percent. In the barrier layer, the content is limited to 1.5 weight percent but should preferably be below 0.35 weight percent. The content in the barrier layer should be preferably 0.15-0.35 weight percent.

Copper at higher contents than 0.3 weight percent may be disadvantageous in that barrier layer may become more noble than the core which from a corrosion point of view gives rise to an unwanted electrical potential gradients. The copper content should therefore not exceed 0.3 weight percent in the barrier layer. The copper content in the core layer can be higher, however, up to 1.3 weight percent. The copper content of the core layer should preferably not exceed 0.3 weight percent.

Chromium and zirconium and manganese are so-called dispersoid creators at low levels. Since coarse particles are formed at higher chromium contents, the chromium content in the core layer should not exceed 0.3 weight percent. In the barrier layer the sum of the manganese and chromium levels should not exceed 0.2 weight percent since the barrier layer must recrystallize at brazing temperature.

Indium and tin are sometimes added in small quantities to modify the material's electrochemical nature. Contents should be limited to ≤0.2% for indium and ≤0.1% for tin.

DETAILED DESCRIPTION OF THE EMBODIMENT

FIG. 1 shows a schematic picture of the sandwich material 1 according to a first preferred embodiment of the invention. The sandwich material 1 shows a core layer 2 of a first aluminum alloy and a barrier layer 3 of a second aluminum alloy. The barrier layer 3 is arranged on the side of the core layer 2 to be brazed to a component 4 which is coated with a braze cladding 5. The component 4 is located at the side of the sandwich material 1. FIG. 1 shows that the barrier layer 3 is the outermost layer on the side of the sandwich material 1 to be brazed to the braze coated component 4. Alternatively, (not shown in FIG. 1) the sandwich material can exhibit two barrier layers 3 of the second aluminum alloy which is arranged on each side of the core layer 2. Each layer is the outermost layer on the side of the sandwich material to be brazed to another component. Alternatively, (not shown in FIG. 1) the sandwich material 1, shows a core layer 2 of the first aluminum alloy, a barrier layer 3 of the second aluminum alloy and a layer 6 of a second aluminum alloy which has corrosion protective properties, whereby the barrier layer 2 and the corrosion protective layer 6 are arranged on each side of the core layer.

FIG. 2 shows a schematic picture of a sandwich material 1 according to a second preferred embodiment of the invention. The sandwich material 1 includes a core layer 2 of a first aluminum alloy in which one side of a barrier layer 3 of a second aluminum alloy is organized. The sandwich material includes a braze cladding 5 which is arranged on the barrier layer. Alternatively, (not shown in FIG. 2) the sandwich material 1 can exhibit two barrier layers 3 of the second aluminum alloy which is arranged on each side of the core layer 2. The sandwich material can also comprise an additional braze cladding 5 arranged on each of the barrier layers 3. Alternatively (not shown in FIG. 2) the sandwich material can exhibit a barrier layer 3 and a braze cladding 5 which is arranged on one side of the sandwich material and a further layer which exhibits corrosion protective properties arranged on the other side of the sandwich material.

In the above described preferred embodiments of the sandwich material according to the invention, the core layer 2 comprises a first aluminum alloy with a composition according to any of the attached requirements. The barrier layer 3 is composed of a second aluminum alloy with a composition according to any of the attached requirements. The composition of the braze cladding on the braze coated component 4 and of the sandwich material 1 is determined by the brazing process and other factors and may consist of any of 4XXX-alloys with silicon contents of 5-12 weight percent.

EXAMPLE

The following example describes the results of tests made with a sandwich material according to the invention. Example 1 relates to a sandwich material according to a first preferred embodiment of the invention. Example 2 relates to a sandwich material according to a second preferred embodiment of the invention. Example 3, 4 and 5 are comparative examples.

Example 1

A sandwich material has been produced by rolling together a plate of a barrier layer and an ingot of the core alloy through hot rolling and cold rolling. The thickness of the ingot was 370 mm, and the thickness of the barrier layer 64 mm (15% of total thickness). The compositions of the layers are shown in Table 1. The temperature at the start of the hot rolling was 500° C. Hot rolling was carried out until the thickness of the sandwich material was 4 mm without problems of bending. Cold rolling was carried out until the thickness was 0.2 mm. This resulted in a sandwich material for which 87% of the thickness consisted of the core alloy and on one side 13% of the barrier layer. The plate was annealed so that it recrystallized. Then the sandwich material was rolled with a thickness reduction of 10%. The variation of the thickness of the barrier layers over the strip width was less than 1 percentage point over 75% of the strip width.

TABLE 1

Composition of the sandwich material in weight percent

|  | Si | Fe | Cu | Mn | Zr | Ti | Others |
|---|---|---|---|---|---|---|---|
| Core Alloy | 0.5 | 0.4 | 0.2 | 1.7 | 0.1 | <0.01 | <0.01 |
| Barrier Layer | 0.4 | 0.4 | 0.2 | <0.01 | <0.01 | 0.12 | <0.01 |

A piece of sandwich material was dipped in flux, then hung up vertically in a furnace with nitrogen atmosphere and subjected to a heat treatment similar to that used in the brazing of car coolers: heating from room temperature to 600° C. for 20 min followed by a period of 3 min at this temperature and then rapid cooling to room temperature. The layer was recrystallized in a grain size which was greater than 50 microns before the braze solidus temperature was reached.

After brazing simulation, the sandwich material has an unusually high static strength for being a non heat treatable aluminum alloy. The yield strength, Rp0,2, after braze simulation is as high as 90 MPa at room temperature as compared to 40-55 MPa for the standard alloys for inert gas brazed heat exchangers such as EN-AW 3003 and 3005. A comparison with the sandwich material according to example 2 shows that the material after braze simulation also exhibits an unusually high static, creep and fatigue strength for being a non heat treatable aluminum alloy.

The sandwich material is then brazed in inert gas after coating with flux to 0.10 mm thick braze plated fins of an alloy with a composition according to Table 2. The braze joints between the sandwich material and the fins showed good braze fillets.

TABLE 2

Composition of the fins weight percent

|  | Si | Fe | Mn | Zr | Zn | Others |
|---|---|---|---|---|---|---|
| Core Alloy | 0.8 | 0.2 | 1.6 | 0.1 | 1.4 | <0.01 |
| Braze Cladding | 7.7 | 0.2 | <0.01 | <0.01 | 0.01 | <0.01 |

Example 2

A sandwich material has been produced by rolling together braze plates and barrier layers and an ingot of the core alloy by hot rolling and cold rolling. The thickness of the ingot was 370 mm, the braze plates 42 mm (8.4% of total thickness) and the barrier layers 32 mm (6.4% of total thickness). The composition of the layers is shown in Table 3. The temperature at the hot rolling start was 500° C. Hot rolling was carried out until the thickness of the sandwich material was 4 mm without problems of bending. Cold rolling was carried out until the thickness was 0.45 mm. This resulted in a sandwich material in which 74% of the thickness consisted of the core alloy; and on each side of it 6% of the barrier layer and 7% of the braze material. The plate was annealed so that it recrystallized. Then the sandwich material was rolled with a thickness reduction of 12%. The variation in thickness of the barrier layer and braze cladding over the strip width was less than 1 percent measured over 75% of the strip width.

TABLE 3

Composition in weight percent

|  | Si | Fe | Mn | Mg | Zr | Ti | Others |
|---|---|---|---|---|---|---|---|
| Core Alloy | 0.5 | 0.4 | 1.7 | 0.2 | 0.1 | <0.01 | <0.01 |
| Barrier Layer | 0.1 | 0.4 | <0.01 | 0.2 | <0.01 | 0.12 | <0.01 |
| Braze Cladding | 10 | 0.4 | <0.01 | <0.01 | <0.01 | <0.01 | <0.01 |

Figure 4:
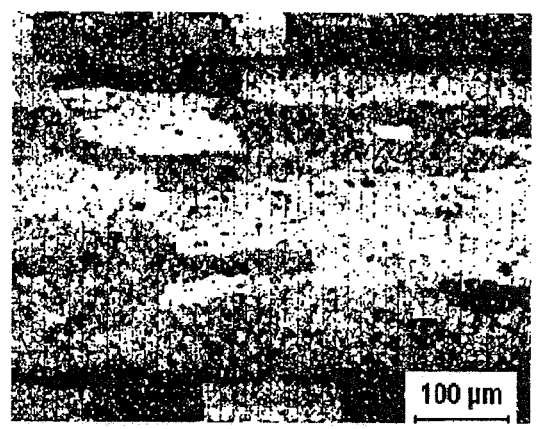
FIG. 4 shows the grain structure of the longitudinal section through the sandwich material in Example 1 after braze simulating heat treatment.

A piece of sandwich material was dipped in flux, then hung up vertically in a furnace with nitrogen atmosphere and subjected to heat treatment similar to that used in the brazing of car coolers: heating from room temperature to 600° C. for 30 minutes followed by a period of 3 minutes at this temperature and then rapid cooling to room temperature. The braze material melted and most of the braze flowed to the bottom end of the plate. As shown in FIG. 3, only a very small amount of braze metal penetrated the barrier layer's grain boundaries. The reason for this is that the barrier layer was recrystallized in a grain size which was greater than 50 microns before the braze metal solidus temperature was reached, FIG. 4.

Figure 5:
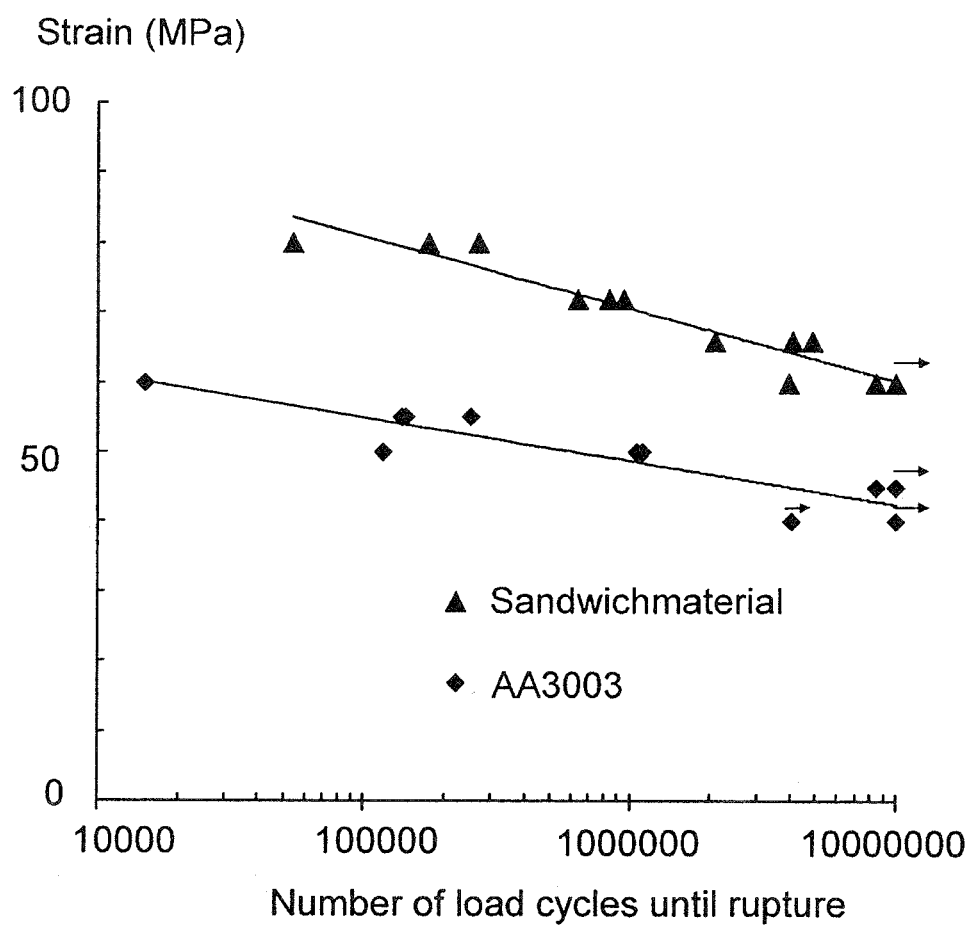
FIG. 5 shows a comparison of fatigue strength at 250° C. with the tensile, axial load of R=0.1 after braze simulating heat treatment for the sandwich material in Example 1 and a standard material of AA3003 in condition H14 clad with a braze alloy to a thickness of 8% of the total thickness.
Figure 6:
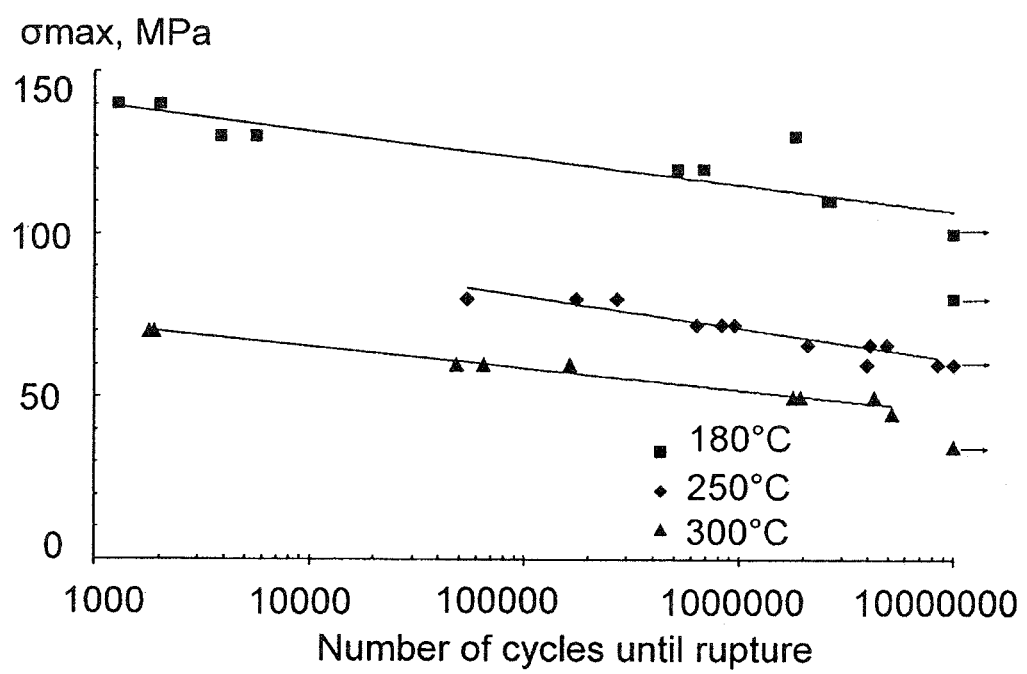
FIG. 6 shows a comparison of fatigue strength at different temperatures.

After braze simulation, the sandwich material has an unusually high static strength for being a non heat treatable aluminum alloy. The yield strength, Rp0,2, after braze simulation is as high as 95 MPa at room temperature as compared to 40-55 MPa for the standard alloys for inert gas brazed heat exchangers such as EN-AW 3003 and 3005. This high proof stress remains also after exposing the sandwich material to 250° C. for 3 months. A comparison of creep and fatigue properties is shown in FIGS. 5 and 6.

To examine how thin the barrier layer can be made and still prevent the silicon from the braze metal from penetrating the core, the sandwich material was rolled to different thicknesses, re-crystallization annealed and rolled again with 10% thickness reduction. At 0.17 mm thickness when the barrier layer was 10 micron thick, there was a significant penetration during the above-mentioned heat treatment to simulate brazing. At 0.22 mm thickness when barrier layer was 13 micron thick there was only a very marginal penetration.

Attempts were also made to determine the appropriate thickness reduction after re-crystallization annealing. The strength after simulated brazing increased with an increasing reduction rate of up to 16% thickness reduction. For reduction rates of 5% and lower, or at 15% and higher a significant penetration of silicon from the braze cladding during brazing was obtained. For reduction rates between 7% and 14% the penetration of silicon was very marginal.

Example 3

A sandwich material was produced in the same manner as in Example 2 with the difference that the composition of the barrier layer was alloy type EN AW-3003, see Table 4.

TABLE 4

| | Composition in weight percent | | | | |
| --- | --- | --- | --- | --- | --- |
| | Si | Fe | Mn | Cu | Others |
| Barrier Layer | 0.1 | 0.4 | 1.1 | 0.1 | <0.01 |

Figure 7:
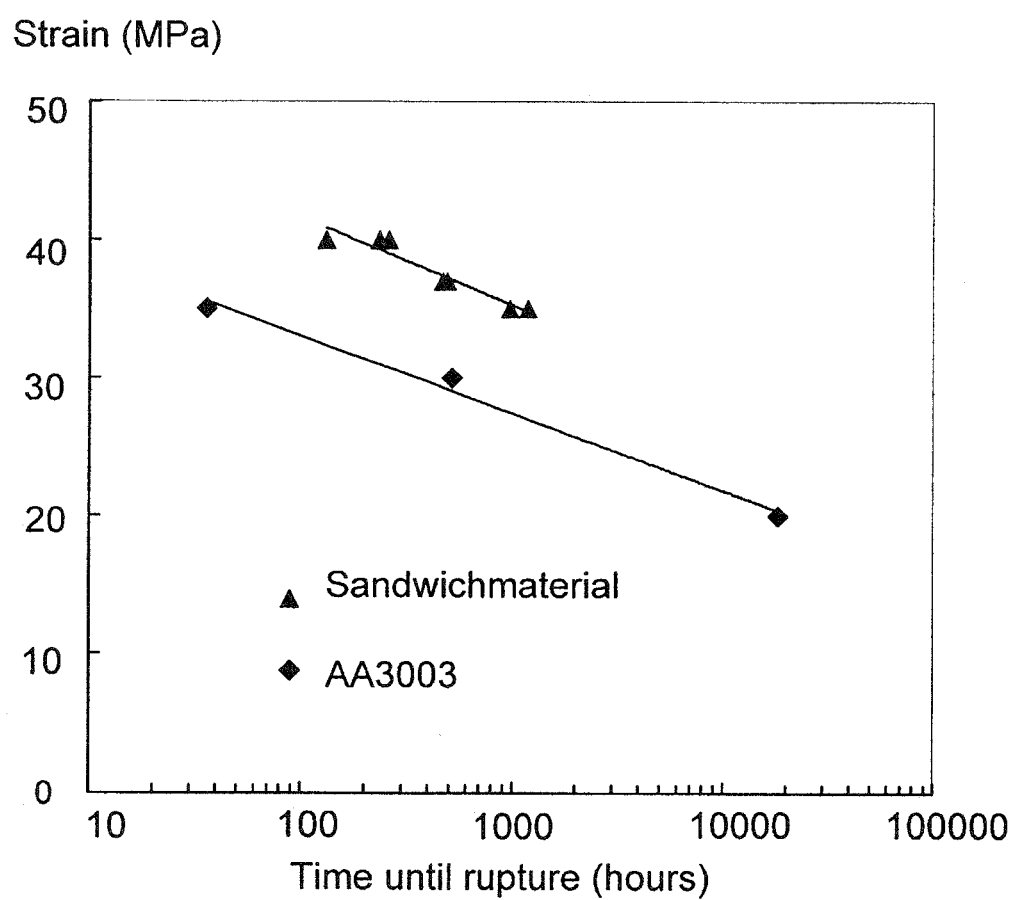
FIG. 7 shows a comparison of creep strength at 250° C. of the same material as in FIG. 3.

Rolling and heat treatment was carried out as in Example 2. This barrier layer does not recrystallize and thus does not prevent the silicon from the braze cladding from penetrating the core material which leads to its partial melting, see FIG. 7.

Example 4

Figure 8:
FIG. 8 shows the micro structure of the longitudinal section through the sandwich material in example 2 after braze simulating heat treatment.

Experiments with varying manganese contents in the barrier layer which was conducted in the same manner as in Example 2 showed that the manganese content must be below 0.3 weight percent so that the barrier layer is recrystallized. FIG. 8, showing the grain structure in the longitudinal section through the strip after a braze simulated heat treatment, shows that an alloy content of 0.3 weight percent manganese in the barrier layer does not recrystallize early enough in the brazing process which leads to a substantial penetration of silicon from the braze cladding and to melting. This is due to manganese separation of small particles—dispersoids—which prevent the material from re-crystallizing if the deformation during the cold-rolling between the annealing and brazing is small [F J Humphreys, M. Hatherly, "Recrystallization annealing and Related Phenomena", Pergamon 1996, ISBN 008 0418848]. The composition of the layers is shown in Table 5.

TABLE 5

| | Composition in weight percent | | | | | |
| --- | --- | --- | --- | --- | --- | --- |
| | Si | Fe | Mn | Zr | Ti | Others |
| Core Alloy | 0.78 | 0.16 | 1.6 | 0.12 | 0.04 | <0.01 |
| Barrier Layer | 0.09 | 0.27 | 0.30 | <0.01 | <0.01 | <0.01 |
| Braze Cladding | 7.0 | 0.4 | <0.01 | <0.01 | <0.01 | <0.01 |

The same results were obtained with a strip that had a barrier layer with the composition according to Table 6, while the composition of the core alloy and braze cladding was the same as that given in Table 3.

TABLE 6

| | Composition in weight percent | | | | |
| --- | --- | --- | --- | --- | --- |
| | Si | Fe | Mn | Mg | Others |
| Barrier Layer | 0.1 | 0.3 | 0.28 | 0.18 | <0.01 |

Example 5

Example 5 is a comparative example. A sandwich material was to be produced in the same manner as in Example 2 with the difference that the composition of the barrier layer would be of the alloy type EN-AW1050A, see Table 7.

TABLE 7

| | Composition in weight percent | | |
| --- | --- | --- | --- |
| | Si | Fe | Others |
| Barrier Layer | 0.1 | 0.3 | <0.01 |

In hot-rolling the joined layers were bent upwards after the passage of the roller gap after a few passes in rolling which made continued rolling impossible.

Figure 9:
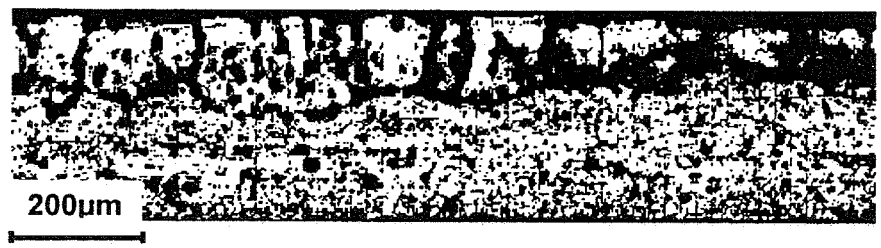
FIG. 9 shows the grain structure in the longitudinal section through the sandwich material in the example 3 after braze simulating heat treatment.
Figure 10:
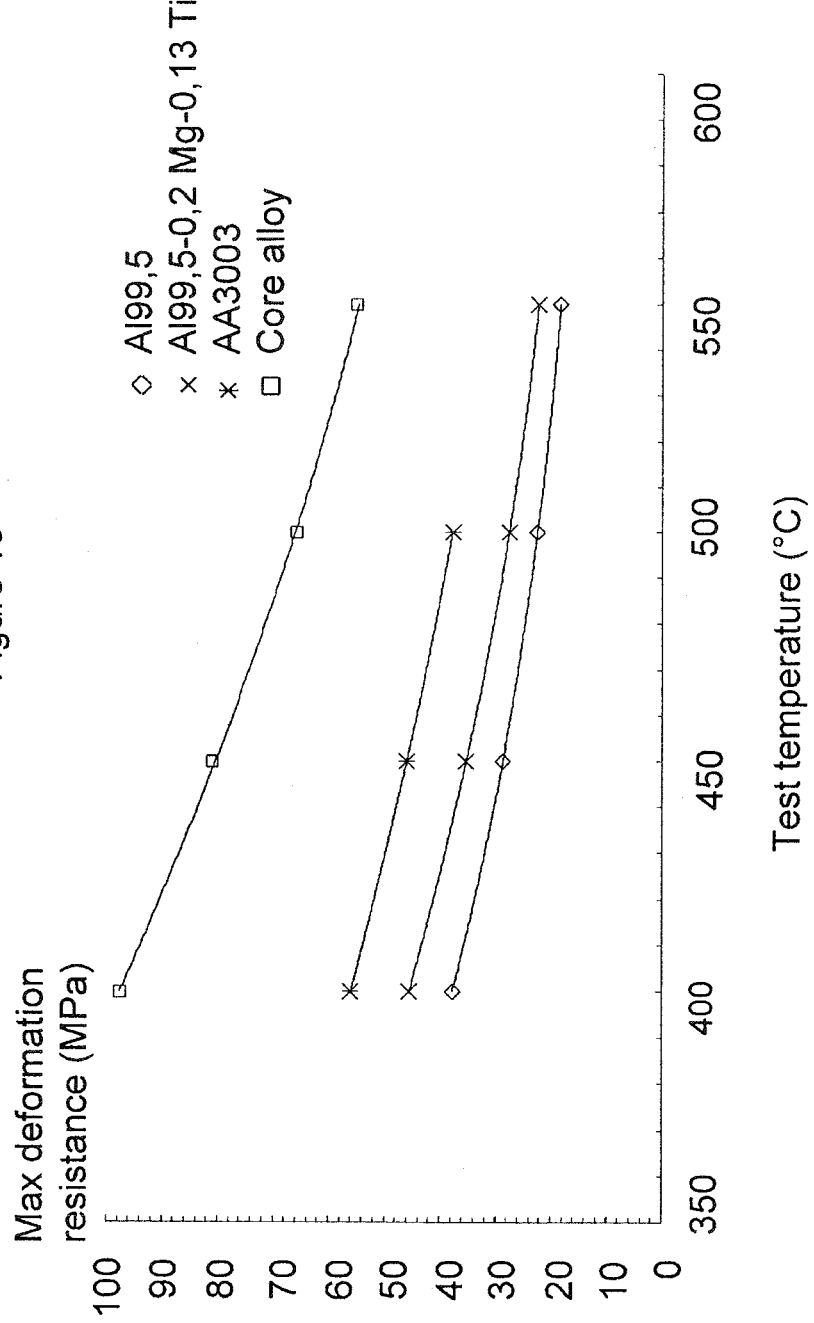
FIG. 10 shows the deformation resistance of different alloys.

Bending of the rolled layers was caused by the barrier layer being too soft, which gave rise to a thickening of the barrier layer just above the entrance of the roller gap, which in turn gave rise to a flexural torque on the layers rolled together. As shown by the rolling experiment and the results of measurements of the deformation rate for different alloys, see FIG. 9, the deformation resistance of the barrier layer must be at least 40% of the core alloy deformation resistance in the temperature range 400°-500° C.

The deformation resistance was measured as the maximum force per unit cross-sectional area which is required to deform cylinders of 21 mm height and 14 mm in diameter. Circular tracks with a depth of 0.2 mm and a width of 0.75 mm were milled at each end of the cylinders with a distance of 2 mm. The cylinders are heated to the required temperature and deformed with a deformation rate of $2\ s^{-1}$ to obtain at least a 50% height reduction. Boron nitride is used as a lubricant.

The embodiments that have been described in the application are intended to illustrate the invention and should not be considered as a limitation of the attached patent claims. Changes and modifications can be made to the invention without deviating from the invention as defined in the patent claims.

The invention claimed is:

1. Sandwich material for brazing comprising a core layer of a first aluminum alloy and a barrier layer of a second aluminum alloy wherein,
the first alloy, constituting the core layer contains (in weight %): 0.8-2% Mn, ≤1.0% Mg, 0.3-1.5% Si, ≤0.3% Ti, ≤0.3% Cr, ≤0.3% Zr, :≤1.3% Cu, ≤0.5% Zn, ≤0.2% In, ≤0.1% Sn and ≤0.7% (Fe+Ni), the balance consisting of Al and: ≤0.05% of each of the unavoidable impurities,
the second alloy, constituting the barrier layer containing (in weight %): ≤0.2% Mn+Cr, ≤1.0% Mg, ≤1.5% Si, ≤0.3% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities,
the barrier layer is the outermost layer of the sandwich material on the side of the sandwich material to be brazed to another component,
the barrier layer, after heating the sandwich material to brazing temperature, exhibits a recrystallized structure with a grain size which in parallel to the surface is larger than 50 microns, and
the core layer after brazing exhibits a non recrystallized or partially recrystallized structure.

2. Sandwich material for brazing comprising a core layer of a first aluminum alloy, a barrier layer of a second aluminum alloy and a braze cladding, wherein,
the first alloy, constituting the core layer contains (in weight %): 0.8-2% Mn, ≤1.0% Mg, 0.3-1.5% Si, ≤0.3% Ti, ≤0.3% Cr, ≤0.3% Zr, ≤1.3% Cu, ≤0.5% Zn, ≤0.2% In, ≤0.1% Sn and ≤0.7% (Fe+Ni), the balance consisting of Al and ≤0.05% of each of the unavoidable impurities,
the second alloy, constituting the barrier layer containing (in weight %): ≤0.2% Mn+Cr, ≤1.0% Mg, 0.04-0.9% Si, ≤0.3% Ti, ≤0.2% Zr, ≤0.3% Cu, ≤0.5% Zn, 0.2% In, ≤0.1% Sn and ≤1.5% (Fe+Ni), the balance consisting of Al and ≤0.05% of each of the unavoidable impurities, and the barrier layer, after heating the sandwich material to brazing temperature, exhibits a recrystallized structure with a grain size which in parallel to the surface is larger than 50 microns, the core layer after brazing exhibits a non-recrystallized or partially recrystallized structure, and the barrier layer is between the core layer and the braze cladding.

3. Sandwich material according to claim 1 in which the core layer consists of an alloy containing (in weight %): 0.8-2% Mn, ≤1.0% Mg, 0.5-0.9% Si, ≤0.3% Ti, ≤0.3% Cr, ≤0.3% Zr, ≤1.3% Cu, ≤0.5% Zn, ≤0.2% In, ≤0.1% Sn and ≤0.7% (Fe+Ni), the balance consisting of Al and ≤0.05% of each of the unavoidable impurities.

4. Sandwich material according to claim 1 in which the core layer contains (in weight %): 0.8-2.0% Mn, ≤1.0% Mg, 0.5-0.9% Si, ≤0.3% Ti, ≤0.3% Cr, ≤0.2% Zr, ≤0.3% Cu, ≤0.5% Zn, ≤0.2% In, ≤0.1% Sn and ≤0.35% (Fe+Ni), the balance consisting of Al and ≤0.05% of each of the unavoidable impurities.

5. Sandwich material according to claim 1 or 2 in which the core layer contains (in weight %): 1.0-1.7% Mn, ≤1.0% Mg, 0.5-0.9% Si, ≤0.3% Ti, ≤0.3% Cr, 0.2% Zr, ≤0.3% Cu, ≤0.5% Zn, ≤0.2% In, ≤0.1% Sn and ≤0.35% (Fe+Ni), the balance consisting of Al and ≤0.05% of each of the unavoidable impurities.

6. Sandwich material according to claim 1 in which the barrier layer is an alloy containing (in weight %): ≤0.2% Mn+Cr, ≤1.0% Mg, 0.04-0.9% Si, ≤0.3% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities.

7. Sandwich material according to claim 1 in which the barrier layer is an alloy containing (in weight %): ≤0.2% Mn+Cr, ≤1.0% Mg, 0.04-0.9% Si, 0.1-0.2% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities.

8. Sandwich material according to claim 2 in which the core layer contains (in weight %): 1.0-1.7% Mn, ≤0.3% Mg, 0.5-0.9% Si, ≤0.3% Ti, ≤0.3% Cr, ≤0.2% Zr, ≤0.3% Cu, ≤0.5% Zn, ≤0.2% In, ≤0.1% Sn and ≤0.35% (Fe+Ni), the balance consisting of Al and ≤0.05% of each of the unavoidable impurities, and the barrier layer is an alloy containing (in weight %): ≤0.2% Mn+Cr, ≤0.3% Mg, 0.04-0.9% Si, 0.1-0.2% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities.

9. Sandwich material according to claim 1 in which the core layer contains (in weight %): 1.0-1.7% Mn, ≤0.05% Mg, 0.5-0.9% Si, ≤0.3% Ti, ≤0.3% Cr, ≤0.2% Zr, ≤0.3% Cu, ≤0.5% Zn, ≤0.2% In, ≤0.1% Sn and ≤0.35% (Fe+Ni), the balance consisting of Al and ≤0.05% of each of the unavoidable impurities, and the barrier layer is an alloy containing (in weight %): ≤0.2% Mn+Cr, ≤0.05% Mg, 0.04-0.9% Si, 0.1-0.2% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities.

10. Sandwich material according to claim 1 consisting of the core layer of the first aluminum alloy and two barrier layers of the second aluminum alloy arranged on each side of the core material.

11. Sandwich material according to claim 1 in which the sandwich material after brazing exhibits a fatigue strength which is higher than 40 MPa at 1 million load cycles with a tensile load of R=0.1 at 300° C.

12. Sandwich material according to claim 2 in which the barrier layer, before hot-rolling, exhibits a deformation resistance at a temperature of 200-500° C. which is at least 40% of the core layer maximum deformation resistance, and which recrystallizes during heating to brazing temperature.

13. Method for manufacturing of a sandwich material for brazing according to claim 1, consisting of the steps to:
provide a first layer, constituting the core layer, of the first aluminum alloy;
arrange at least one layer of the second aluminum alloy, constituting the barrier layer, on at least a first surface of the core layer;
roll the layer at a temperature of 200° C.-500° C.

14. Method for producing sandwich material for brazing according to claim 2, comprising the steps to:
provide a first layer, constituting the core layer, of the first aluminum alloy;
arrange at least one layer of the second aluminum alloy, constituting the barrier layer on a first surface of the core layer;
arrange at least one layer of a braze material at least on a first surface of the second aluminum alloy;
roll the layer at a temperature of 200° C.-500° C.

15. Method for manufacturing of a sandwich material for brazing according to claim 1, consisting of the steps to:
provide a first layer, constituting the core layer, of the first aluminum alloy;
arrange at least one layer of the second aluminum alloy, constituting the barrier layer, on at least a first surface of the core layer;
roll the layer at a temperature of 200° C.-500° C.;
optionally, cold rolling;
recrystallization annealing; and
cold-rolling with a reduction of 5-20%.

16. Method according to claim 14 in which the barrier layer before hot-rolling exhibits a deformation resistance at a temperature of 200-500° C. which is at least 40% of the core layer maximum deformation resistance and which recrystallizes during heating to brazing temperature.

17. Brazed product comprising the sandwich material of claim 1 or 2 having a yield strength at room temperature, Rp0.2, which is at least 65 MPa.

18. Brazed product comprising the sandwich material of claim 1 or 2 wherein the core layer has a deformed, non-recrystallized or partially recrystallized structure, and has a yield strength at 200° C., Rp0.2, which is at least 65 MPa.

19. Brazed product comprising the sandwich material of claim 1 or 2 having a yield strength at 300° C., Rp0.2, which is at least 50 MPa.

20. Brazed product of claim 1 or 2 wherein the product is a heat exchanger.

21. A method of operating a brazed product according to claim 17, the method comprising:
exposing the brazed product to an operating temperature over 150° C.

22. Sandwich material according to claim 8 in which the barrier layer is an alloy containing (in weight %): ≤0.2% Mn+Cr, 0.15-0.3% Mg, 0.04-0.9% Si, 0.1-0.2% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities.

23. Sandwich material according to claim 1 in which the barrier layer is an alloy containing (in weight %): ≤0.2%

Mn+Cr, 0.15-0.3% Mg, 0.04-0.9% Si, 0.1-0.2% Ti, ≤0.2% Zr, ≤0.3% Cu, ≤0.5% Zn, ≤0.2% In, ≤0.1% Sn and ≤1.5% (Fe+Ni), the balance consisting of Al and ≤0.05% of each of the unavoidable impurities.

* * * * *